US009651745B2

(12) United States Patent
Chou et al.

(10) Patent No.: US 9,651,745 B2
(45) Date of Patent: May 16, 2017

(54) OPTICAL CONNECTOR MODULE FOR ALIGNING OPTICAL CONNECTORS TO OPTICAL CONNECTING SEAT

(71) Applicant: OptoMedia Technology Inc, Hsinchu County (TW)

(72) Inventors: Hui-Tsuo Chou, Hsinchu County (TW); Tung Lou Lin, Hsinchu County (TW)

(73) Assignee: OPTOMEDIA TECHNOLOGY INC, Hsinchu County (TW)

( * ) Notice: Subject to any disclaimer, the term of this patent is extended or adjusted under 35 U.S.C. 154(b) by 0 days.

(21) Appl. No.: 14/865,480

(22) Filed: Sep. 25, 2015

(65) Prior Publication Data

US 2016/0091679 A1    Mar. 31, 2016

Related U.S. Application Data

(60) Provisional application No. 62/055,087, filed on Sep. 25, 2014.

(51) Int. Cl.
*G02B 6/42* (2006.01)

(52) U.S. Cl.
CPC ......... *G02B 6/4231* (2013.01); *G02B 6/4257* (2013.01); *G02B 6/428* (2013.01)

(58) Field of Classification Search
CPC .. G02B 6/4231; G02B 6/4204; G02B 6/4257; G02B 6/428
USPC ................................. 385/14, 24, 88–90, 147
See application file for complete search history.

(56) References Cited

U.S. PATENT DOCUMENTS

| 5,583,958 A * | 12/1996 | Yanagawa | G02B 6/125 385/14 |
| 5,659,647 A * | 8/1997 | Kravitz | G02B 6/4221 385/49 |
| 6,240,235 B1 * | 5/2001 | Uno | C03B 11/08 385/137 |
| 6,241,399 B1 * | 6/2001 | Nobuhara | G02B 6/30 385/81 |
| 2002/0028048 A1 * | 3/2002 | Dair | G02B 6/4214 385/92 |
| 2002/0181853 A1 * | 12/2002 | Ido | G02B 6/421 385/19 |
| 2003/0206703 A1 * | 11/2003 | Chiu | G02B 6/4208 385/93 |
| 2004/0022487 A1 * | 2/2004 | Nagasaka | G02B 6/4204 385/31 |

(Continued)

*Primary Examiner* — Akm Enayet Ullah
(74) *Attorney, Agent, or Firm* — Chun-Ming Shih

(57) ABSTRACT

An optical connector module includes a substrate including a base disposed on an upper surface of the substrate; an electronic chip disposed on the upper surface of the substrate; an optical component disposed on the base and electrically connected to the electronic chip; a socket fixed on the substrate for coving the optical component, and including at least one guide hole and a light transmitting window; a fixing block including at least one guide pin and at least one opening, wherein the guide pin is inserted into the guide hole to fix the fixing block on the socket and to orient the opening to the optical component via the light transmitting window; and an optical fiber with one end running through the opening of the fixing block to orient the end to the optical component via the light transmitting window.

15 Claims, 5 Drawing Sheets

(56) References Cited

U.S. PATENT DOCUMENTS

| | | | | |
|---|---|---|---|---|
| 2012/0121218 A1* | 5/2012 | Kim | ............... | G02B 6/4292 |
| | | | | 385/14 |
| 2013/0136398 A1* | 5/2013 | Isenhour | ............... | G02B 6/36 |
| | | | | 385/71 |
| 2015/0323753 A1* | 11/2015 | Furuya | ............... | G02B 6/423 |
| | | | | 385/14 |

* cited by examiner (1)

OPTICAL CONNECTOR MODULE FOR ALIGNING OPTICAL CONNECTORS TO OPTICAL CONNECTING SEAT

CROSS-REFERENCE TO RELATED APPLICATIONS

This application claims an invention which was disclosed in Provisional Application No. 62/055,087, filled on Sep. 25, 2014, entitled "Mid-Board Optical (MBO) Solutions". The benefit under 35 USC §119(e) of the United States provisional application is hereby claimed, and the aforementioned application is hereby incorporated herein by reference.

BACKGROUND

Technical Field

The present disclosure relates to an optical connector module, and particularly to an optical connector module provided by a vertical and horizontal side direct coupling.

Related Art

In recent development of data communication, the multiple integration of optical-electronic component is highly increasing for more applications. For example, in the field of optical communication, optical communication elements are usually integrated on the circuit board such that optical devices are directly connected to electronic devices for converting signals. Thus, these optical components on the circuit board usually include a light guide element, the optical communication components for transmitting and receiving light signals. The light signals are converted to electrical signals by those electronic components. Therefore, the mechanical assemblies in above optical and electronic components will affect the quality of the optical and electrical signals for data communication.

Optical fiber connectors are an essential part of substantially any optical communication elements. A typical optical fiber connector comprises housing and a ferrule assembly within the housing. The ferrule assembly comprises a ferrule, which has one or more fiber channels to accommodate fibers, and a fiber secured in each channel such that the end of the fiber is presented for optical coupling by the ferrule. Also, the optical interface of the optical components may lead a delivery loss of an optical transmission path without an accurate alignment for transmitting and receiving light through such as optical components and fibers.

From above description, the optical and electronic components in optical communication configuration will be combined with other component parts, and therefore, both an accurate alignment and a simple assembly will be required for integrating common optical-electronic devices.

SUMMARY

In view of this, this disclosure provides an optical connector module including a substrate, a socket and a fixing block to be assembled for supporting electronic chip and fibers of an optical communication.

An optical connector module of this disclosure includes a substrate, an electronic chip, at least one optical component, a socket, at least one fixing block, and at least one optical fiber.

The substrate includes a base disposed on an upper surface of the substrate.

The electronic chip is disposed on the upper surface of the substrate, for processing electrical signals.

The optical component is disposed on the base and electrically connected to the electronic chip, for transmitting or receiving optical signals.

The socket is fixed on the substrate for coving the optical component, and including at least one guide hole and a light transmitting window.

The fixing block includes at least one guide pin and at least one opening, wherein the guide pin is inserted into the guide hole to fix the fixing block on the socket and to orient the opening to the optical component via the light transmitting window; and The optical fiber includes one end running through the opening of the fixing block to orient the end to the optical component via the light transmitting window.

In one or more embodiment, the base is made of ceramic.

In one or more embodiment, the socket covers the electronic chip on the substrate.

In one or more embodiment, the opening, the light transmitting window, and the optical component are arranged in a direction perpendicular to the upper surface of the substrate.

In one or more embodiment, the opening, the light transmitting window, and the optical component are arranged in a direction in parallel with the upper surface of the substrate.

In one or more embodiment, the optical component is a light-emitter or light-receiver.

In one or more embodiment, the fixing block includes two mounting edges parallel to each other for mounting the mounting edge of another fixing block.

In one or more embodiment, the each of the two mounting edges is a broken-line or a curve-line.

In one or more embodiment, the fixing block includes an engaging portion for engaging to engaging portion of another fixing block.

In one or more embodiment, the optical connector assembly includes a plurality of soldering pad, disposed on the upper surface of the substrate, and the electronic chip and the optical component are fixed onto the upper surface via the soldering pads.

In one or more embodiment, the electronic chip and the optical component are electrically connected via the soldering pads and the substrate.

Through the above approaches, the fixing block can be easily fixed to the socket to align the optical fiber to the optical component by mechanical assembling.

The following embodiments will be described in detail on the above description and the technical solution of this disclosure.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
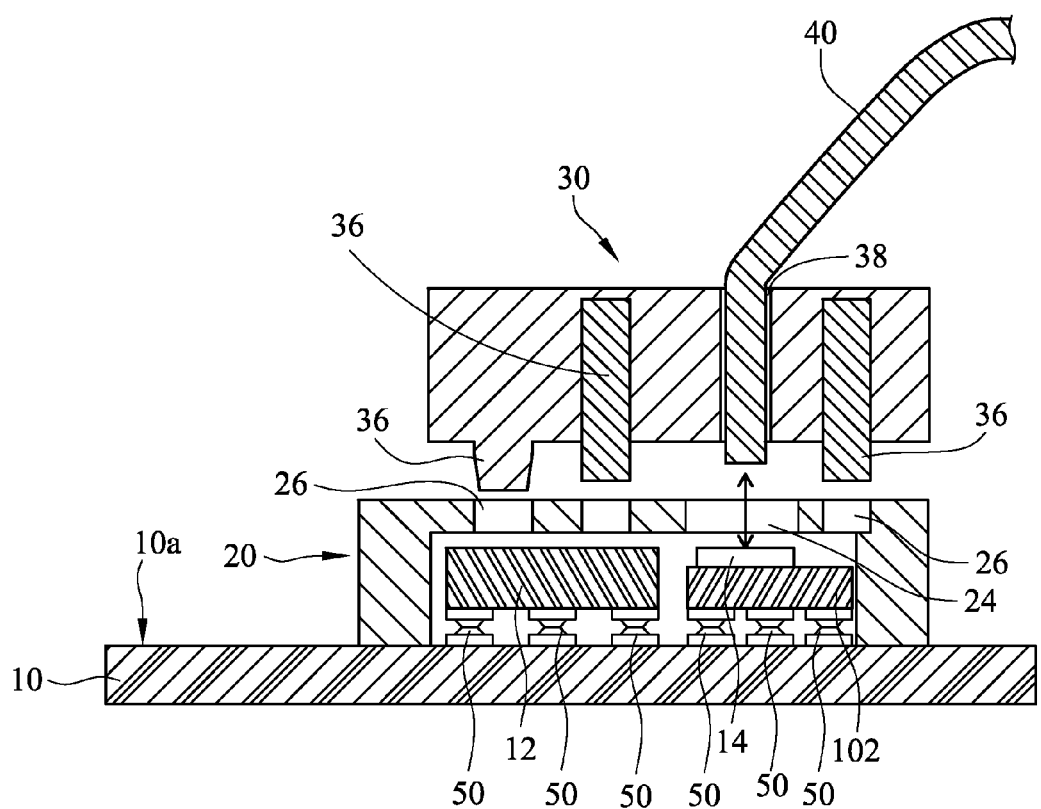
FIG. 1 is a schematic cross-sectional view of an optical connector module of a first embodiment in the present disclosure.

Referring to FIG. 1, a first embodiment of an optical connector module 1 is shown. The optical connector module 1 includes a substrate 10, an electronic chip 12, an optical component 14, a socket 20, a fixing block 30, optical fiber 40, and a plurality of soldering pads 50.

As shown in FIG. 1, the substrate 10 includes an upper surface 10a. A base 102 is made of ceramic and disposed on the upper surface. The electronic chip 12 is disposed on the upper surface 10a of the substrate 10, for processing electrical signals and controlling the optical component 14.

The base 102 is disposed on the upper surface 10a of the substrate 10, and the optical component 14 is disposed on the base 102, such that the optical component 14 is disposed on the upper surface 10a of the substrate 10.

The optical component 14 is electronically connected to the electronic chip 12; wherein the optical component 14 is a light-emitter or light-receiver to transmit or receive optical signals. In particular, the electronic chip 12 encodes received data and drives the optical component 14 to convert the encoded data into optical signals and transmit the optical signals to the optical fiber 40; or the optical component 14 receives optical signals from the optical fiber 40 and converts the optical signals into electrical signals, and the electronic chip 12 encodes the electrical signals into encoded data and transmits the encoded data.

Furthermore, the soldering pads 50 are disposed on the upper surface 10a of the substrate 10, and the substrate 10 is a circuit board, for example a PCB. The electronic chip 12 and the optical component 14 are fixed onto the upper surface 10a via the soldering pads 50. The electronic chip 12 and the optical component 14 are electrically connected via the soldering pads 50 and the substrate 10. The soldering pads 50 and the circuit board are used to alter traditional wire-bonding (connecting the electronic chip 12 to the optical component 14 by metal wires).

As shown in FIG. 1, the socket 20 is fixed on the upper surface 10a of the substrate 10 as well. The socket 20 covers the electronic chip 12 and the optical component 14. The socket 20 includes a light transmitting window 24, and the optical component 14 is exposed via the light transmitting window 24.

The fixing block 30 includes plural guide pins 36 and an opening 38. Each of the guide pins 36 can be monolithically formed with the fixing block 30; or each of the guide pins 36 is embedded into the fixing block 30 with one end exposed.

The socket 20 includes plural guide holes 26. The guide pins 36 are inserted into the guide holes 26 to fix the fixing block 30 on the socket 20 and to orient the opening 26 to the optical component 14 via the light transmitting window 24.

The optical fiber 40 includes one end running through the opening 38 of the fixing block 30, to orient the end to the optical component 14 via the light transmitting window 30.

Therefore, the fixing block 30 can be easily fixed to the socket 20 by the guide pins 36 and the guide holes 26, and the fixed fixing block 30 can align the optical fiber 40 to the optical component 14 easily by mechanical assembling, so as to solve the problem that the process for aligning the optical fiber 40 to the optical component 14 is difficult in the art.

In this embodiment, the socket 20 covers the electronic chip 12. However, it is not necessary to cover the electronic chip 12, the electronic chip 12 may be exposed without being covered by the socket 20.

In this embodiment, the opening 38, the light transmitting window 24, and the optical component 14 are arranged in a direction perpendicular to the upper surface 10a of the substrate 10 (Namely, the optical component 14 faces upward). The arrangement can be changed to that the opening 38, the light transmitting window 24, and the optical component 14 are arranged in a direction in parallel with the upper surface 10a of the substrate 10 (Namely, the optical component 14 faces horizontally).

The fixing block 30 can be provided with plural openings 38 corresponding plural optical fibers 40 and plural optical components 14 disposed on the substrate 10, such that fixing blocks 30 offer a high fiber 40 density in a relatively small optical module 1 with an precise alignment for a fiber-to-optical-component connecting interface. Through the fixing block 30 being fixed to the socket 20 by the guide holes 26 and the guide pins 36, each of the plural optical fibers 40 are automatically aligned to the corresponding optical component 14.

In the above condition, the number of the opening 38 is equal to that number of the optical fiber 40 and the number of the optical components 14. However, only one light transmitting window 24 is required. The light transmitting window 24 can be configured according to the arrangement of the optical components 14. For example, when the optical components 14 are arranged in a line, the light transmitting window 24 can be configured as a long-slot.

Figure 2:
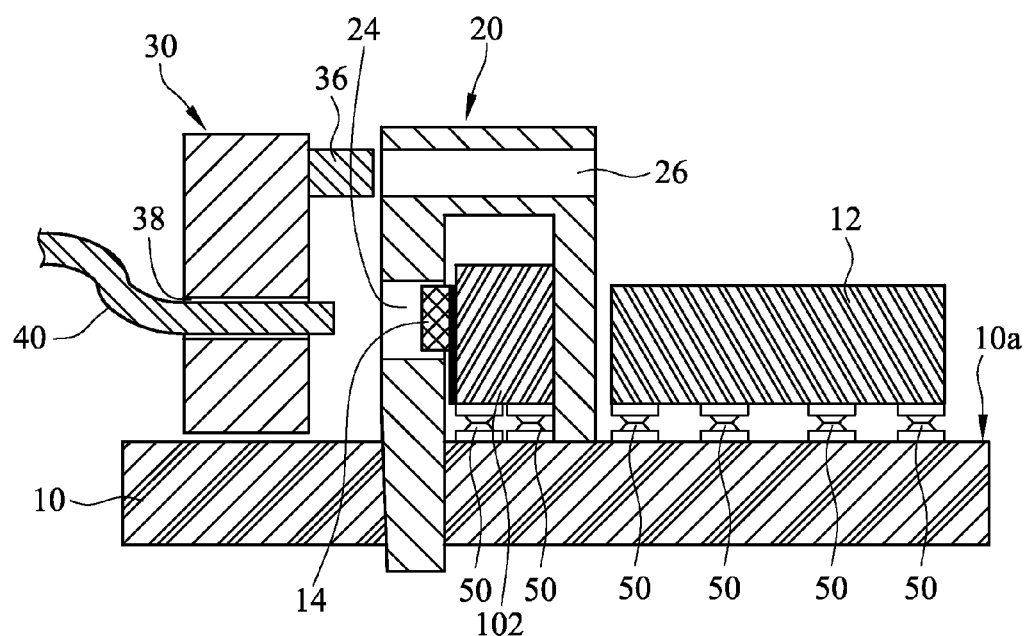
FIG. 2 is a schematic cross-sectional view of an optical connector module of a second embodiment in the present disclosure.

Referring to FIG. 2, a second embodiment of an optical connector module 1 is shown. The optical connector module 1 includes a substrate 10, an electronic chip 12, an optical component 14, a socket 20, a fixing block 30, optical fiber 40, and a plurality of soldering pads 50. In second embodiment, the opening 38, the light transmitting window 24, and the optical component 14 are arranged in a direction in parallel with the upper surface 10a of the substrate 10 (Namely, the optical component 14 faces horizontally). Furthermore, the electronic chip 12 is not covered by the socket 20, the electronic chip 12 is exposed without being covered by the socket 20.

Figure 3:
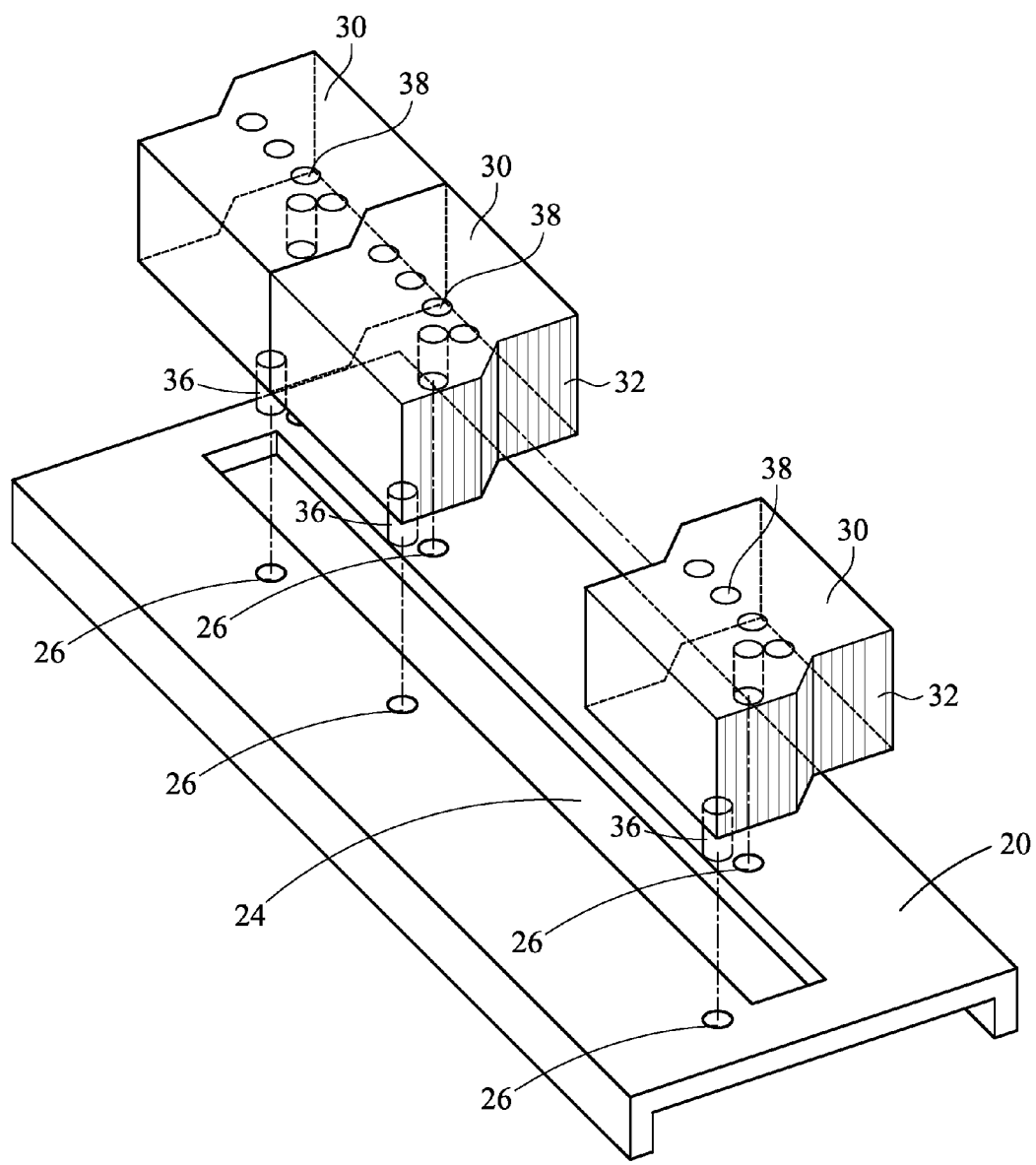
FIG. 3 is an example of the fixing block.

Referring to FIG. 3, plural fixing blocks 30 can be assembled into a Multi-channel block set. Each of the fixing blocks 30 includes two mounting edges 32 parallel to each other and perpendicular to the substrate 10. Each of the mounting edges 32 can mount a mounting edge 32 of another fixing block 30.

To provide more surface contact area of two mounting edges 32, The edge-line of the two mounting edges 32 can be a broken-line or a curve-line in the top view of the fixing block 30, as long as the two neighboring mounting edges 32 are in shape-complementary.

The openings 38 of plural fixing blocks 30 are arranged in a lone line, the light transmitting window 24 of the socket 20 can be configured as a long-slot.

Figure 4:
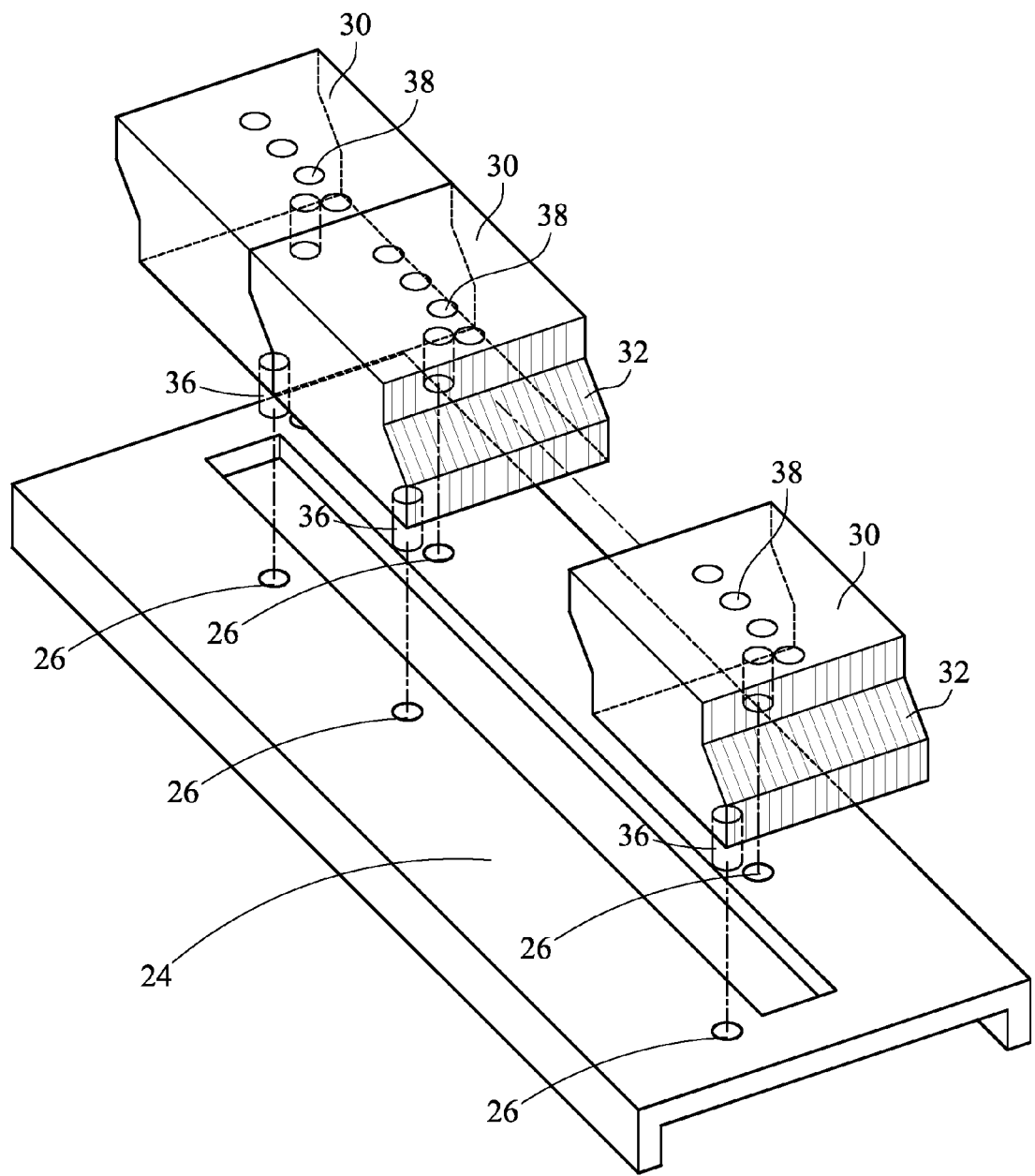
FIG. 4 is another example of the fixing block.

Referring to FIG. 4, the edge-line of the two mounting edges 32 can be a broken-line or a curve-line in the lateral view of the fixing block 30, as long as the two neighboring mounting edges 32 are in shape-complementary.

Figure 5:
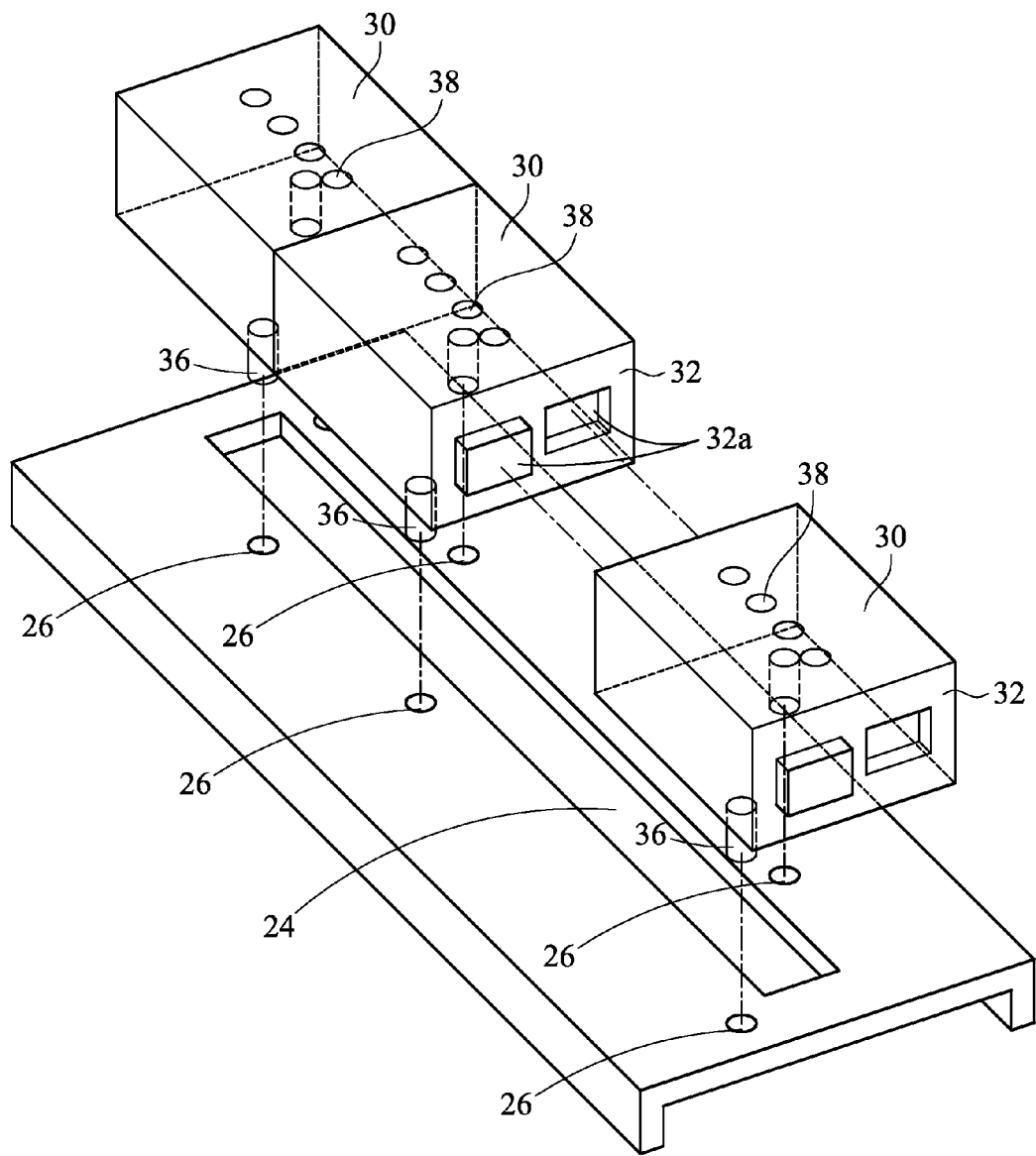
FIG. 5 is yet another example of the fixing block.

Referring to FIG. 5, the fixing block can be equipped with an engaging portion 32a disposed on the mounting edge 32 for engaging to engaging portion 32a of another fixing block 30, so as to enhance mounting effect.

What is claimed is:
1. An optical connector module, comprising:
a substrate including an upper surface;
an optical connecting seat disposed on the upper surface of the substrate, comprising:
  a base disposed on the upper surface of the substrate;
  an electronic chip disposed on the upper surface of the substrate for processing electrical signals;
  at least one optical component disposed on the base, and electrically connected to the electronic chip for transmitting or receiving optical signals;

a socket fixed on the upper surface of the substrate for coving the optical component, and including at least one guide hole and a light transmitting window;

at least one optical connector, comprising:

at least one fixing block including a main body, at least one guide pin and at least one opening, wherein a first length of the light transmitting window is larger than a second length of the fixing block, and the first length is parallel with the second length, wherein the guide pin is inserted into the guide hole to fix the optical connector on the optical connecting seat, and to orient the opening of the optical connector to the optical component via the light transmitting window of the optical connecting seat, wherein the main body of the optical connector is outside the socket, when the optical connector is connected to the optical connecting seat; and at least one optical fiber including one end running through the opening of the fixing block to orient the end to the optical component via the light transmitting window.

2. The optical connector assembly of claim 1, wherein the base is made of ceramic.

3. The optical connector assembly of claim 1, wherein the socket covers the electronic chip.

4. The optical connector assembly of claim 1, wherein the opening, the light transmitting window, and the optical component are arranged in a direction perpendicular to the upper surface of the substrate.

5. The optical connector assembly of claim 1, wherein the opening, the light transmitting window, and the optical component are arranged in a direction in parallel with the upper surface of the substrate.

6. The optical connector assembly of claim 1, wherein the optical component is a light-emitter or light-receiver.

7. The optical connector assembly of claim 1, wherein the fixing block includes two mounting edges parallel to each other for mounting the mounting edge of another fixing block.

8. The optical connector assembly of claim 1, wherein the each of the two mounting edges is a broken-line or a curve-line.

9. The optical connector assembly of claim 1, wherein the fixing block includes an engaging portion for engaging to engaging portion of another fixing block.

10. The optical connector assembly of claim 1, further comprising a plurality of soldering pads, disposed on the upper surface of the substrate, and the electronic chip and the optical component are fixed onto the upper surface via the soldering pads.

11. The optical connector assembly of claim 10, wherein the electronic chip and the optical component are electrically connected via the soldering pads and the substrate.

12. The optical connector assembly of claim 1, each of the guide pins is monolithically formed with the fixing block.

13. The optical connector assembly of claim 1, each of the guide pins is embedded into the fixing block with one end exposed.

14. The optical connector assembly of claim 1, wherein the optical component is disposed on a side surface of the base, and the side surface of the base is perpendicular to the upper surface of the substrate.

15. The optical connector assembly of claim 1, wherein the optical component is disposed within the light transmitting window.

* * * * *